UNITED STATES PATENT OFFICE.

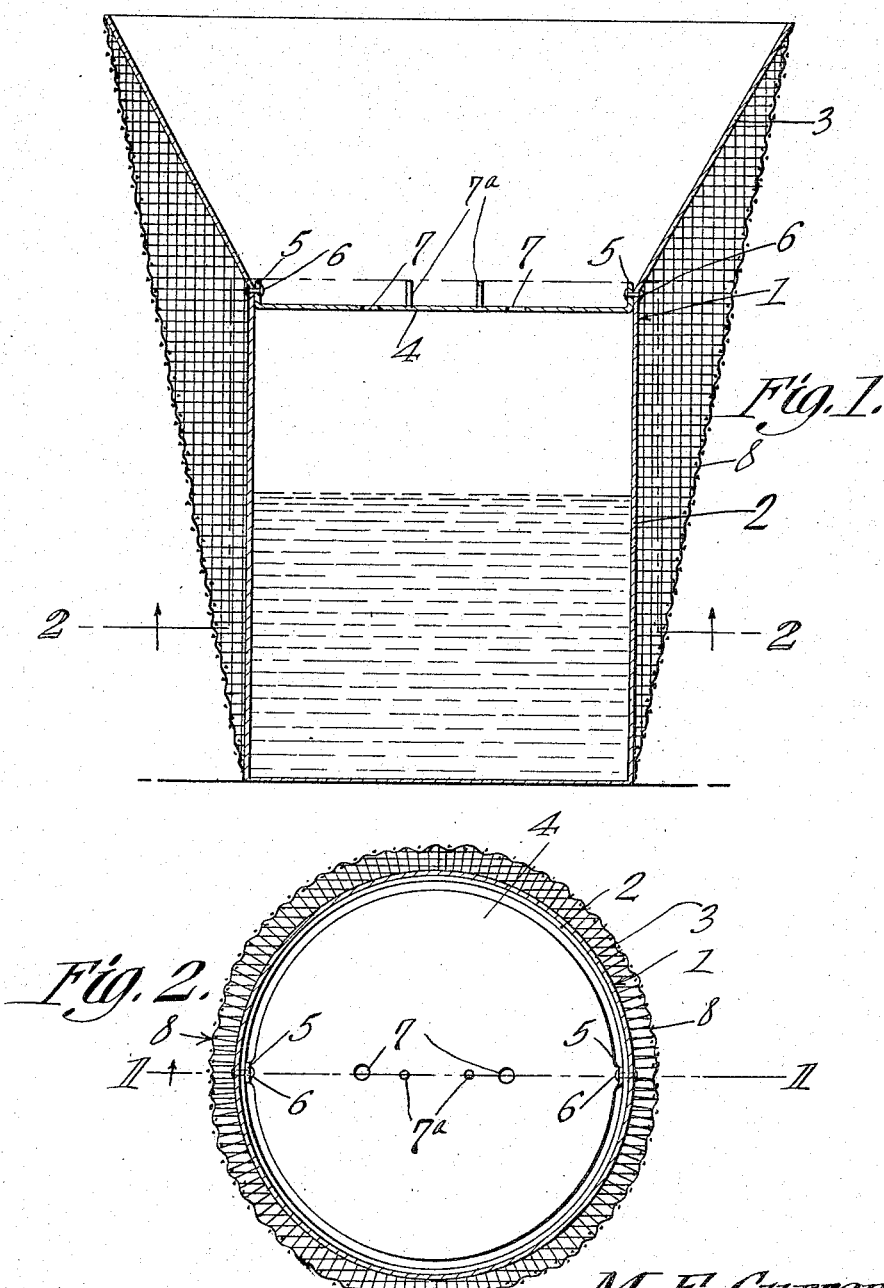

MARTIN E. CURRENT, OF QUEEN CITY, MISSOURI.

TRAP.

1,168,861.  Specification of Letters Patent.  Patented Jan. 18, 1916.

Application filed July 8, 1915. Serial No. 38,727.

*To all whom it may concern:*

Be it known that I, MARTIN E. CURRENT, a citizen of the United States, residing at Queen City, in the county of Schuyler and State of Missouri, have invented a new and useful Trap, of which the following is a specification.

The present invention appertains to traps, and aims to provide a novel and improved trap for catching mice, rats and other rodents, although the trap may be employed for catching other pests.

It is the object of the invention to provide a trap of utmost simplicity and cheapness, which will also be thoroughly practical and efficient in use, the device being so constructed that the rodents may readily climb upwardly thereon and in attempting to descend within the trap to approach the bait will fall through a trap door into the confining or captivity chamber which may be filled with water for drowning the captured rodents.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a vertical section of the trap, taken on the line 1—1 of Fig. 2. Fig. 2 is a horizontal section of the device taken on the line 2—2 of Fig. 1.

In carrying out the invention, there is employed a funnel-shaped receptacle 1, preferably constructed of sheet metal, and having the cylindrical body 2 and the flared rim 3. The inner surface of the rim is preferably smooth so that the rodents cannot obtain a foothold thereon.

A trap door 4 is pivotally supported within the upper portion of the body 2 of the receptacle immediately below the rim 3, the door 4 having diametrically upturned ears 5 which are pivoted by means of rivets or other pivot elements 6 to the body 2, whereby the weight of the trap 4 will normally hold the same in horizontal or closed position. When the rodent treads upon one side portion or wing of the door 4, the door will swing toward an upright position so that the rodent will pass on down into the body 2 of the receptacle. The receptacle 2 may be filled with water up to a certain level, for drowning the captured rodents. It is also preferable to provide the trap door 4 with apertures 7 through which a string, wire or other element may be passed for tying a piece of bait upon pins 7$^a$ carried by the trap door, for attracting or luring the rodents.

In order that the rodents may readily ascend the exterior of the trap for entering the receptacle, a removable frusto-conical or tapered ladder 8, preferably composed of wire mesh or reticulated material, surrounds the receptacle, and is spaced slightly therefrom. This ladder 8 has its lower end secured to the lower end of the body 2 and has its upper end attached to the rim 3 of the receptacle.

If desired, the receptacle may be mounted upon a suitable base, to avoid the tilting or upsetting of the trap, if this is liable to occur.

The present trap embodies but few parts, and may be inexpensively manufactured, and it is also desirable and effective in use.

When the bait is carried by the door 4, the same will attract the rodents, who will climb the ladder or screen 8, so as to pass into the flared rim 3 of the receptacle. The rodents in attempting to reach the bait will tread upon the door and will slip down past the door into the confining compartment or chamber within the body 2 of the receptacle. When the rodents pass on over the edge of the rim 3, it is practically impossible for them to retreat, due to the fact that the ladder 8 is located under the rim 3 and is not readily accessible from within the rim, although the ladder enables the rodents to readily ascend the trap to enter the rim 3 of the receptacle.

What is claimed is:

In a trap, a funnel-shaped receptacle having a cylindrical body and a flared rim, a trap door disposed within the upper portion of the body immediately below the rim and having diametrically opposite upturned ears pivoted to the body, and a frusto-conical reticulated ladder surrounding the receptacle and having its larger end attached to the edge of said rim and its smaller end attached to the lower end of said body.

In testimony that I claim the foregoing as my own, I have hereto affixed my signature in the presence of two witnesses.

MARTIN E. CURRENT.

Witnesses:
R. L. BILLINGS,
H. E. TIPTON.